United States Patent [19]

Sigai

[11] Patent Number: 4,710,674
[45] Date of Patent: Dec. 1, 1987

[54] PHOSPHOR PARTICLE, FLUORESCENT LAMP, AND MANUFACTURING METHOD

[75] Inventor: A. Gary Sigai, Lexington, Mass.

[73] Assignee: GTE Laboratories Incorporated, Waltham, Mass.

[21] Appl. No.: 718,095

[22] Filed: Apr. 3, 1985

Related U.S. Application Data

[63] Continuation-in-part of Ser. No. 607,865, May 7, 1984, abandoned, and a continuation-in-part of Ser. No. 607,846, May 7, 1984, abandoned.

[51] Int. Cl.$^4$ .......................... H01J 1/70; H01J 61/35
[52] U.S. Cl. ........................................ 313/489; 427/67
[58] Field of Search .................. 427/64, 67, 126.4; 313/486, 487, 489; 252/30, 48; 454/26

[56] References Cited

U.S. PATENT DOCUMENTS

| | | | |
|---|---|---|---|
| 2,151,496 | 3/1939 | Beese | 176/122 |
| 2,238,784 | 4/1941 | Scott et al. | |
| 2,331,306 | 10/1943 | Casellini | |
| 2,386,277 | 10/1945 | Smith | 176/122 |
| 2,586,304 | 2/1952 | Coltman et al. | 250/488.1 |
| 2,817,599 | 12/1957 | Edwards et al. | |
| 2,878,137 | 3/1959 | Butler et al. | 427/28 |
| 2,920,003 | 1/1960 | Davis | 428/404 |
| 2,971,859 | 2/1961 | Sisneros et al. | 428/403 K |
| 3,067,356 | 12/1962 | Ray | |
| 3,141,990 | 7/1964 | Ray | |
| 3,251,337 | 5/1966 | Latta et al. | 118/48 |
| 3,408,223 | 10/1968 | Shortes | 117/100 |
| 3,549,412 | 12/1970 | Frey, Jr. et al. | |
| 3,599,029 | 8/1971 | Martyny | |
| 3,636,352 | 1/1972 | Wanamaker et al. | |
| 3,845,343 | 10/1974 | Hammer | 313/467 |
| 3,875,449 | 4/1975 | Byler et al. | 313/466 |
| 3,886,396 | 5/1975 | Hammer et al. | 313/486 |
| 3,923,682 | 12/1975 | Dale et al. | 252/301.6 P |
| 3,963,639 | 6/1976 | Klein | 427/67 |
| 3,984,587 | 10/1976 | Lipp | 427/70 |
| 3,995,191 | 11/1976 | Kaduk et al. | |
| 4,058,639 | 11/1977 | Scheurs | |
| 4,079,288 | 3/1978 | Maloney et al. | |
| 4,208,448 | 6/1980 | Panaccione | 427/67 |
| 4,243,909 | 1/1981 | Brecher et al. | 313/487 |
| 4,287,229 | 9/1981 | Watanabe et al. | 427/64 |
| 4,289,991 | 9/1981 | Schreurs | |
| 4,339,501 | 7/1982 | Inoue et al. | 428/404 |
| 4,396,863 | 8/1983 | Ranby et al. | 313/486 |
| 4,440,800 | 4/1984 | Morton et al. | |
| 4,459,507 | 7/1984 | Flaherty | 313/489 |
| 4,473,634 | 9/1984 | Dodds et al. | |
| 4,505,720 | 3/1985 | Gabor et al. | 51/308 |
| 4,515,827 | 5/1985 | Dodds et al. | 427/68 |
| 4,585,673 | 4/1986 | Sigai | 427/313 |
| 4,639,637 | 1/1987 | Taubner | 313/489 |
| 4,670,688 | 6/1987 | Sigai | 313/489 |

FOREIGN PATENT DOCUMENTS

| | | |
|---|---|---|
| 2450435 | 4/1976 | Fed. Rep. of Germany . |
| 3032225A1 | 4/1982 | Fed. Rep. of Germany . |
| 22584 | 2/1977 | Japan . |
| 22586 | 2/1977 | Japan . |
| 22579 | 2/1977 | Japan . |
| 1343250 | 1/1974 | United Kingdom . |

OTHER PUBLICATIONS

Chemical Vapor Deposition of Aluminium Oxide Films from Organo-Aluminum Compounds, Duffy et al, RCA Review, 1970.
Types of Gas Fluidization, D. Geldart, Power Technology, 1973.

(List continued on next page.)

Primary Examiner—Stewart J. Levy
Assistant Examiner—Hezron E. Williams
Attorney, Agent, or Firm—Martha Ann Finnegan; David M. Keay

[57] ABSTRACT

A phosphor particle having a non-particulate, conformal aluminum oxide coating and a fluorescent lamp incorporating aluminum oxide coated phosphor particles are disclosed. A method for improving the lumen maintenance of a fluorescent lamp is also disclosed. The method involves applying a non-particulate, conformal aluminum oxide coating to the outer surface of individual particles of a finely-divided fluorescent lamp phosphor, applying the coated phosphor particles to a fluorescent lamp envelope, and processing the phosphor coated envelope into a finished lamp.

19 Claims, 2 Drawing Figures

OTHER PUBLICATIONS

I. A. Mezentseva, S. B. Nauch. Tr. NVII Lyuminoforv I OSOBO Chist. Vesh CH Estv. (D3RAP), 80(19):27(1980).

W. Lehmann, J. Electrochem. Soc.: Solid State Sci. & Technology 128 (8):1787(1981).

Chem. Abstr. No. 79392d, vol. 82, 1975.

B. E. Yoldas et al., Ceramic Bulletin 59, 640 (1980).

Chemical Abstract No. 91:221327T.

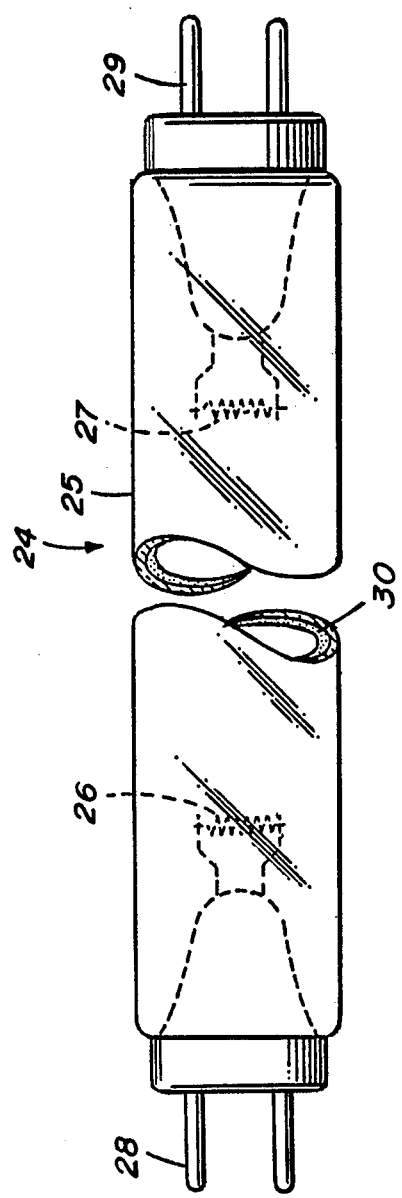

PHOSPHOR PARTICLE, FLUORESCENT LAMP, AND MANUFACTURING METHOD

CROSS-REFERENCE TO RELATED APPLICATIONS

This application is a continuation-in-part of application Ser. No. 607,865, filed on May 7, 1984, now abandoned and application Ser. No. 607,846, filed on May 7, 1984, now abandoned.

BACKGROUND OF THE INVENTION

This invention relates to fluorescent lamps and phosphor particles. More particularly, this invention is concerned with the improvement of lumen maintenance of fluorescent lamps.

Fluorescent lamps are low-pressure mercury arc discharge devices which have electrodes at each end of an elongated glass envelope and which contain a phosphor coating on the inner surface of the glass envelope. Such lamps experience a gradual decrease in light output with increasing hours of use. A variety of factors contribute to the drop-off in light output during lamp operation. These factors include deposits of impurities from the cathode; the formation of various mercury compounds due to the bombardment of the phosphor by atoms and ions of mercury; changes in the phosphor itself; and changes in the glass envelope, particularly where it may be subject to ultraviolet radiation. The ability of such lamps to resist the drop-off in light output is generally termed lumen maintenance which is measured as the ratio of light output at a given life span compared to an initial light output and expressed as a percentage.

While the decrease in light output with time is an occurrence for all fluorescent lamps, it presents a greater problem for high output and very high output lamps than for normally loaded lamps, and for phosphors particularly susceptible to degradation in the hostile environment of the discharge.

Although all of the factors listed above can be present to a greater or lesser degree in acting to reduce light output, it is presently believed that one of the primary causes of the drop-off in light output during operation is the formation of mercury compounds, particularly on the surface of the phosphor coating.

These mercury compounds are believed to form an ultraviolet radiation absorbing film which prevents the phosphor from being sufficiently excited by the radiation from the mercury discharge to achieve maximum light output.

Various uses of alumina have been proposed to improve lamp performance. One such use involves employing a layer of alumina on the interior of the bulb wall and applying the phosphor layer thereover. Another use is the application of a thin layer of alumina over the phosphor layer.

While these techniques provide some benefit, it is believed that obtaining further increases in lumen maintenance while applying only one layer of material to the inner surface of the lamp envelope is desirable.

SUMMARY OF THE INVENTION

These and still further objects, features and advantages of the invention are achieved, in accordance herewith, by providing a method for improving lumen maintenance of fluorescent lamps comprising the steps of depositing a continuous aluminum oxide coating on individual particles of a finely-divided fluorescent lamp phosphor powder to form individually and continuously coated phosphor particles; applying one or more layers of phosphor to a fluorescent lamp envelope to form a phosphor coated envelope, at least one of the phosphor layers having a phosphor component comprising individually and continuously coated phosphor particles; and processing the phosphor coated envelope into a finished fluorescent lamp.

In accordance with another aspect of the present invention there is provided a fluorescent lamp comprising a glass envelope wherein the inner wall of the glass envelope is coated with one or more layers of phosphor, at least one of the phosphor layers having a phosphor component comprising individual particles of a finely-divided fluorescent lamp phosphor of which have been individually coated with a continuous aluminum oxide coating.

In accordance with still another aspect of the present invention there is provided a phosphor particle, having a continuous aluminum oxide coating surrounding its outer surface.

BRIEF DESCRIPTION OF THE DRAWING

FIG. 2 is a diagrammatic elevational view of a lamp.

Figure 1:
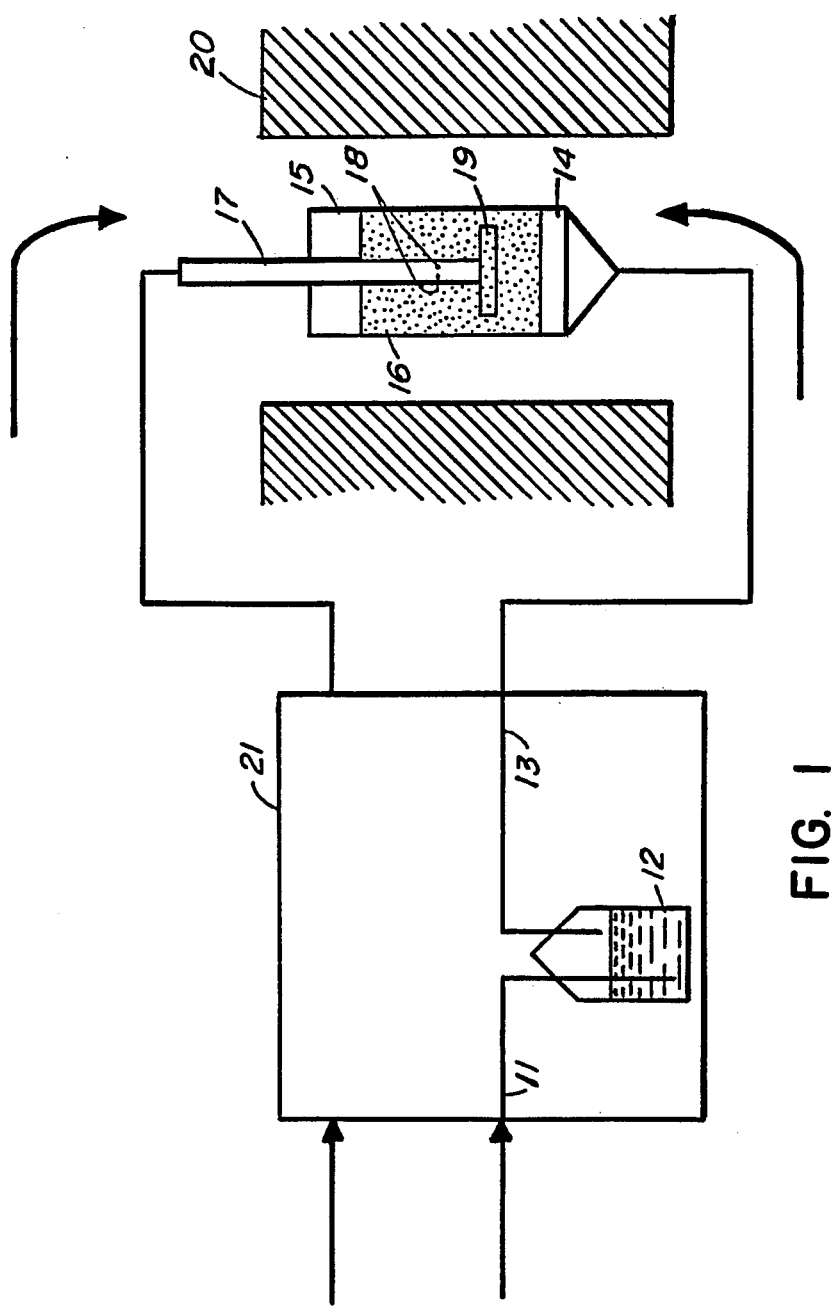
FIG. 1 is a schematic representation of an apparatus suitable for use in the method of the present invention.

For a better understanding of the present invention, together with other and further objects, advantages and capabilities thereof, reference is made to the following disclosure and appended claims in connection with the above-described drawing.

DETAILED DESCRIPTION

This invention relates to improving lumen maintenance of fluorescent lamps and phosphor particles. In accordance with the invention, a continuous aluminum oxide coating is deposited on individual particles of a finely-divided fluorescent lamp phosphor powder to form individually and continuously coated phosphor particles.

The inner surface of a fluorescent lamp envelope is then coated with one or more layers of phosphor. Each layer of phosphor applied to the envelope contains at least one phosphor component. A phosphor which contains more than one phosphor component is more commonly referred to as a phosphor blend. At least one of the phosphor layers applied to the lamp envelope has a phosphor component comprising individually and continuously coated phosphor particles. The coated envelope is then processed into a finished lamp according to known techniques. In those lamps containing more than one phosphor layer, a layer containing the individually and continuously coated phosphor particles is preferably the last layer of phosphor applied to the lamp envelope, i.e., the layer directly adjacent to arc generating medium within the lamp.

"Continuous", as used to describe the aluminum oxide coating herein, means non-particulate, i.e., the aluminum oxide coating surrounding each phosphor particle does not consist of individual aluminum oxide particles.

The key features of the aluminum oxide coated phosphor particles of the present invention are: (1) the continuous, or non-particulate, nature of the coating on each particle; (2) the conformal nature of the coating on each particle, replicating submicron features found naturally occurring on the uncoated phosphor particles; and (3) that each phosphor particle is individually coated.

These key features of the coated phosphor particle of the present invention are established and/or supported by Scanning Electron Microscopy (SEM), Auger analysis, reflection electron diffraction techniques, and BET measurements.

Scanning electron microscopy of the coated particles shows that the particles are individually coated; that the aluminum oxide coating on the phosphor particles is continuous and does not consist of aluminum oxide particles; and that the coating is conformal, replicating the submicron features of the underlying phosphor particle.

Auger analysis indicates that the coating provides substantially complete coverage of the outer surface of the phosphor particle.

Reflection electron diffraction shows the aluminum oxide coating to be continuous and noncrystalline, i.e., amorphous.

BET measurements support the conformal and continuous nature of the aluminum oxide coating to the extent the surface area of the coated phosphor is not appreciably changed when compared to the surface area of the uncoated phosphor. If the coating were particulate in nature, the surface area of the coated phosphor would be significantly increased. BET measurements also support that the phosphor particles are individually coated.

A fluorescent lamp phosphor comprises any material excited to fluorescence by ultra-violet radiation. Examples of such phosphors include, but are not to be construed as being limited to, alkaline earth halophosphate phosphor and manganese-doped zinc orthosilicate phosphor.

In a preferred embodiment, the continuous aluminum oxide coating is deposited by chemical vapor deposition in a fluidized bed, e.g., an aluminum containing precursor material is deposited on the outer surface of phosphor powder particles while the particles are suspended in an inert gas stream and the aluminum-containing precursor material is reacted to form aluminum oxide. Examples of suitable precursors of the aluminum-containing compounds include alkyl aluminum compounds; aluminum alkoxides; and aluminum acetylacetonates.

In the preferred embodiment, the fluidized bed is formed by passing an inert gas through the phosphor particles in order to suspend the particles in the inert gas stream. Examples of inert gases suitable for use in this method include nitrogen, argon, helium, neon, or mixtures thereof. In addition to supporting the phosphor particles in a fluidized bed, the inert gas functions as a carrier gas. A volatilizable aluminum containing coating precursor material is vaporized into the inert gas before the inert gas enters the reaction chamber in which the phosphor particles become suspended. Preferably the carrier gas is saturated with the vapor of the aluminum containing coating precursor material. As the carrier gas containing the vaporized aluminum containing coating precursor material passes upwardly through the phosphor particles to suspend the particles in a fluidized bed, the particles are enveloped by the vapor of the coating precursor material which is contained in the carrier gas.

Preferably, the fluidized particles are exposed to the vaporized aluminum containing precursor material at a first temperature, the first temperature being less than the temperature at which the precursor material decomposes. After the particles have been enveloped by the precursor material, the precursor material is reacted to form a continuous aluminum oxide coating on the surface of the individual particles at a second temperature, the second temperature being greater than or equal to the temperature at which the precursor material reacts to form aluminum oxide.

The fluidized bed is most preferably maintained in a temperature gradient ranging from a lowest temperature to a highest temperature. The lowest temperature should be less than the temperature at which the coating precursor material will decompose, while the highest temperature should be equal to or greater than the temperature at which the coating precursor material reacts to form the desired aluminum oxide coating material.

An oxidizing gas, if necessary, is introduced into the fluidized bed separately from the carrier gas containing the vaporized coating precursor material. The use of an oxidizing gas is optional when an oxygen-containing precursor material is used. Examples of suitable oxidizing gases are air or oxygen. The oxidizing gas may be mixed with a diluent inert gas.

The thickness of the coating is dependent upon the amount of time the process is run, the temperature of the evaporation source, the flow rate through the evaporation source, and the surface area of the phosphor.

For a chemical compound or chemical composition to be suitable for use as coating precursor material in the method of the present invention, the compound or composition must be volatilizable. Organo, alkoxide, and acetylacetonate compounds of aluminum which are volatilizable under the conditions of the method may be used as coating precursor materials in the present invention. For example, some suitable aluminum oxide precursor materials are represented by the general formula $R_x(OR')_{3-x}Al$ wherein $0 \leq x \leq 3$ and x is an integer, and R and R are lower alkyl groups, such as: $-CH_3$; $-C_2H_5$; $-C_3H_7$; or $-C_4H_9$. This listing of examples of suitable coating precursor materials for an aluminum oxide coating is not to be construed as necessarily limiting thereof. Any alkyl, alkoxy or acetylacetonate compounds of aluminum which can be vaporized into the inert carrier gas under the conditions of the method may be used as coating precursor material for the continuous aluminum oxide coating. When an oxygen containing coating precursor material, such as an alkoxide or acetylacetonate, is used in the method, the use of an oxidizing gas is optional.

In order to implement the fluidized bed-chemical vapor deposition coating method, the phosphor powder particles must be capable of being fluidized. Phosphor powders having an average particle size range of about 20 to 80 microns and larger can be fluidized with little or no difficulty. Difficulty is encountered, however, in attempting to fluidize fine phosphor powders, i.e., phosphor powders with particles having an average particle size of less than about 20 microns. The difficulty in fluidizing the particles of fine phosphor powder arises from interparticle adhesive forces which cause agglomeration and bridging between the agglomerates. Such agglomeration and bridging of agglomerates normally results in the formation of channels through the bed thereby causing the gas to pass through the channels without fluidizing the particles. Under these circumstances, there is little or no powder bed expansion.

Particles of fine phosphor powders, such as cool-white halophosphate phosphors, willemite, and other lamp quality phosphors which fall within class "C" of the Geldart Classification Scale, can be fluidized and coated by the present method. To fluidize particles of these fine phosphor powders, a small amount, up to about 1 weight percent, of a fluidizing aid should be mixed with the phosphor powder to form a uniform mixture. Preferably, an amount of fluidizing aid less than or equal to about 0.05 weight percent of the phosphor is employed. Suitable fluidizing aids include small particle aluminum oxide, e.g., Aluminum Oxide C, or small particle silica. Fluidization of fine phosphor powders can alternatively be accomplished by additional agitation of the phosphor powder particles by agitating means while the particles are suspended in the stream of carrier gas. This additional agitation can be accomplished by various techniques, such as a mechanical stirrer, and preferably a high speed vibromixer. In a more preferred embodiment of the present invention, both the fluidizing aid and the additional agitation are used together in order to fluidize the phosphor powder and improve the expansion of the fluidized bed. A schematic representation of a fluidized bed reactor suitable for use in a preferred embodiment of the present invention is shown in FIG. 1.

In FIG. 1, a feeder line 11 carries the inert carrier gas into a stainless steel bubbler 12 which contains volatilizable aluminum containing coating precursor material. In the bubbler 12, the coating precursor material is vaporized into the carried gas. The carrier gas containing the precursor can be diluted to provide appropriate concentration of reactants. The carrier gas containing the vaporized aluminum containing coating precursor material is carried through a connector line 13 into the base of a quartz glass reaction tube 15. The carrier gas containing the aluminum containing coating precursor material passes through a quartz frit 14 within the tube 15 which is used to support the phosphor particle bed 16. Also within the tube 15 is a vibrating mixer 17. Circumferentially located on the shaft of the vibrating mixer 17 and near the vibrating disc 19 is a series of holes 18 through which the oxidizing gas with or without an inert diluent gas enters the reaction tube 15. The quartz glass reaction tube 15 is surrounded by, a furnace 20.

The feeder line 11 which carries the inert gas into the bubbler 12 and the bubbler 12 which contains the volatilizable coating precursor material in liquid state are both heated to a temperature which facilitates vaporization of the precursor material into the inert carrier gas. The carrier line 13, which carries the vapor-containing gas stream to the quartz glass reaction tube 15, is heated to a higher temperature than that of line 11 and the bubbler 12 to maintain the precursor material in the vapor state as it is carried to the reaction tube 15 from the bubbler 12.

An important feature of the coating process used in the most preferred embodiment is maintenance of the fluidized bed in a temperature gradient. The frit area of the reaction tube, is heated to and maintained at a temperature which is less than the temperature at which the aluminum containing coating precursor material decomposes. This area of the reaction tube, which is located at the bottom of the fluidized bed, has the lowest temperature of the temperature gradient in which the fluidized bed is maintained.

By introducing the precursor material into the fluidized bed via a stream of inert carrier gas and by maintaining the frit area at a temperature less than the decomposition temperature of the precursor material (which is also less than the highest temperature of the temperature gradient), the outer surface of each phosphor particle in the fluidized bed is enveloped by vapor of the aluminum containing coating precursor material. Introducing the coating precursor material into the reaction tube via an inert carrier gas eliminates the problems of premature reaction of the precursor material to the desired coating material and/or the formation of an undesired by-product. Premature reaction results in formation of the actual coating material or by-product in the carrier line 13 from the bubbler 12 to the reaction tube 15, below the frit, or in the porous openings of the frit 14 itself. Premature reaction can further result in blockage of the frit and interruption of the coating process. The problem of decomposition of the precursor material in the frit area is further avoided by maintaining the frit area at a temperature below the temperature at which the precursor material thermally decomposes. Decomposition of the aluminum containing precursor material can result in body color being imparted to the coated phosphor and/or incorporation of carbon contaminants into the phosphor coating, which contaminants absorb exciting and/or emitting radiation of the phosphor.

An oxidizing gas, if used, is introduced into the fluidized bed separately from the carrier gas. The oxidizing gas may or may not be diluted with an inert gas. Most preferably, the oxidizing gas is introduced into the fluidized bed at a temperature which is less than the temperature at which the coating precursor material will undergo a chemical change in the presence of an oxidizing gas in order to minimize contamination of the coating material with carbon and other carbon containing compounds. With an alkyl aluminum precursor material, the concentration ratio of oxygen to alkyl can affect the body color of the coated particle. A ratio of $O_2$ to trialkyl aluminum less than about 200 to 1 can result in poor, or non-white, body color.

The highest temperature of the temperature gradient must be sufficiently high for the coating precursor material surrounding the outer surface of the phosphor particles to react to form the aluminum oxide material. By reacting the precursor material after the vapor of the aluminum containing precursor material has enveloped the phosphor particle surface, the aluminum oxide coating is continuous, i.e., the coating does not consist of individual particles of a very fine powder, but rather, the coating shows a high degree of conformal coating, replicating submicron features found naturally occurring on the phosphor grain substrates. The coating is noncrystalline.

The individually and continuously coated phosphor particles are then applied to the inner surface of a fluorescent lamp envelope and the lamp envelope is processed into a finished lamp by known techniques.

The following is exemplary of the preparation of a fluorescent lamp containing coated phosphor powder particles in accordance with a preferred embodiment of the present invention and is not to be construed as necessarily limiting thereof.

A fluidized bed 1.5/8 inch (4.0 centimeter) I.D. is used for the method. Two hundred grams of a finely divided phosphor powder and 0.1 g (0.05 weight percent) Aluminum Oxide C, available from Degussa, Inc., the fluidizing aid, are dry blended in a polyethylene jar to obtain a uniform dispersion of the Aluminum Oxide C fluidizing aid throughout the alkaline earth halophosphate powder. The mixture of the phosphor powder and fluidizing aid is added to the quartz glass reaction tube 15 to form the phosphor bed. Liquid trimethyl aluminum is used in the stainless steel bubbler 12 as the coating precursor material. The carrier gas was bubbled into the trimethyl aluminum liquid to form carrier gas containing vaporized trimethyl aluminum. The carrier gas containing vaporized trimethyl aluminum is transported via carrier line 13 to the quartz glass reaction tube 15. Oxygen gas diluted with nitrogen is transported into the fluidized bed through holes 18 circumferentially located on the shaft of the vibrating mixer 17 above the vibrating disc 19. The vibrating mixer is operated at a speed at 60 cycles/minute. Introducing the oxygen into the fluidized bed through an opening or openings located above the vibrating disc, which disc is sufficiently removed from the frit area to avoid the caking of solid material on the frit, eliminated reaction of the precursor material in the frit openings and prevented blockage of the frit openings.

The nitrogen gas line 11 leading into the bubbler 12 and the bubbler 12 are both heated to and maintained at a temperature of 30° C. Line 13 leading out of the bubbler 12 and into the bottom of the quartz glass reaction tube 15 is heated to an maintained at a temperature of about 45° C.

The furnace 20 is a resistance heated 3 zone furnace. The frit area is maintained at a temperature of from about 60° C. to about 150° C.; the oxidizing gas inlet area, located above the vibrating disc, is heated to and maintained at a temperature of about 400° C.; and the area above the oxidizing gas inlet area is heated to and maintained at a temperature of about 650° C., although any temperature of 450° C. or above can be used.

A nitrogen flow of about 100 cc/min is passed into the bubbler 12, and the nitrogen gas containing vaporized trimethyl aluminum (transporting about 700 mg/hr) is transported through line 13 by a stream of inert nitrogen carrier gas and into the reaction tube 15 at a flow rate of about 450 cc/min. The stream of oxygen gas diluted with nitrogen gas is passed into the reaction tube through a second carrier line 21 at a flow rate of about 450 cc/min. A concentration ratio of $O_2$ to trimethyl aluminum of about 200 to 1 is maintained during this reaction to obtain a white body color.

The process is continued for a sufficient time to form a continuous aluminum oxide coating having a predetermined thickness on the outer surface of the individual phosphor particles.

One or more layers of phosphor are applied to the inner surface of a fluorescent lamp envelope. At least one of the phosphor layers applied to the lamp envelope contains a phosphor component comprising the individually and continuously coated phosphor particles. The phosphor coated envelope is then processed into a finished lamp according to known techniques.

As used herein, the term "fluorescent lamp" refers to any lamp containing a phosphor excited to fluorescence by ultra-violet radiation regardless of configuration.

Referring now to the drawing of FIG. 2 one example of with greater particularity, there is shown in FIG. 2 a fluorescent lamp 24 comprising a tubular, hermetically sealed, glass envelope 25. Electrodes 26 and 27 are sealed in the ends of envelope 25. Suitable terminals 28 and 29 are connected to the electrodes 26 and 27 and project from envelope 25. An arc generating and sustaining medium such as one or more inert gases and mercury vapor is included within envelope 25.

A coating of phosphor 30 is applied to the inside surface of envelope 25. The coating 30 includes a phosphor layer comprising particles of a finely-divided fluorescent lamp phosphor which have been individually coated with a continuous aluminum oxide coating. While the fluorescent lamp phosphor can be any material useful in fluorescent lamps, the invention herein described is particularly efficacious when the phosphor is alkaline earth halophosphate phosphor or manganese doped zinc orthosilicate phosphor.

The following Examples are given to enable those skilled in this art to more clearly understand and practice the present invention. These Examples should not be considered as a limitation upon the scope of the invention but merely as being illustrative and representative thereof.

The phosphor numbers given in the Examples below are the identifying numbers utilized by GTE Products Corporation, Towanda, Pa. from which company the phosphors were obtained.

EXAMPLE I

A continuous aluminum oxide coating was deposited on the individual particles of calcium halophosphate (Cool White No. 4459, Lot 795) phosphor powder by chemical vapor deposition while the particles were suspended or fluidized in an inert gas stream. Cool white powder is difficult to fluidize by normal fluidization methods because of the interparticle adhesive forces which cause agglomeration of the fine particles and bridging between the agglomerates. This problem is resolved by the addition of a small quantity, up to about one weight percent, of a fluidizing aid to the phosphor powder. Use of fluidizing aid in an amount less than or equal to 0.05 weight percent is preferred. In the alternative, this problem can be solved by mechanically agitating the phosphor powder while being suspended in the inert gas stream. Preferably, the fluidizing aid is used in conjunction with mechanical agitation. An example of a suitable fluidizing aid is small particle alumina. In this example, 0.05% by weight Aluminum Oxide C ("ALON C") available from Degussa, Inc. was added to the phosphor and the fluidized phosphor was mechanically agitated to achieve optimum fluidization. The fluidized bed was maintained in a temperature gradient, ranging from a lowest temperature to a highest temperature. The lowest temperature was between 60° C. and 200° C., which is less than the decomposition temperature of trimethyl aluminum. The highest temperature was between 500° C. and 650° C., which is sufficiently high to react the trimethyl aluminum with oxidizing gas to form aluminum oxide. The oxidizing gas, consisting essentially of oxygen was introduced into the bed separately from the inert gas stream. The inert gas stream also contained vaporized trimethyl aluminum. As the inert gas stream flowed upwardly to suspend the phosphor particles and form the fluidized bed, the outer surface of each fluidized phosphor particle was coated with trimethyl aluminum vapor. The trimethyl aluminum vapor was oxidized to form a continuous aluminum oxide coating on the outer surface of each phosphor particle. The process was continued for 6 hours and an aluminum oxide coating having a thickness of about 150 Angstroms was formed on the phosphor particles. The individually and continuously coated phosphor particles were then applied to a fluorescent lamp envelope, and processed into a finished lamp according to known techniques including the step of slurrying the phosphor in an organic solvent containing 1% by weight Aluminum Oxide C, normal wet sieving.

Electron microscopy of the coated phosphor particles before being applied to the lamp envelope indicated highly conformal continuous coating of aluminum oxide on the phosphor particles replicating the features of the phosphor substrate which were visible before the phosphor was coated. The submicron features of the coated particle, however, are visibly less pronounced when compared to the submicron features of an uncoated particle. The coating was additionally shown to be noncrystalline by reflection electron diffraction techniques.

Auger analysis of the coated particle surface revealed that complete surface coverage, within the limits of analysis (99.8%), by aluminum oxide has been achieved, based on the attenuation of the calcium peak-to-peak height of the alkaline earth halophosphate phosphor using the formula:

$$\% \text{ coverage} = \left[1 - \left(\frac{I_{Ca,coated}}{I_{Ca,uncoated}}\right)\right] \times 100$$

EXAMPLE II

Uncoated particles of calcium halophosphate (Cool White No. 4459, Lot 795) were admixed with 0.05% by weight Aluminum Oxide C and applied to a fluorescent lamp envelope and processed into a finished lamp according to known techniques, identical to those of Example I.

EXAMPLE III

Uncoated particles of calcium halophosphate (Cool White No. 4459, Lot 795) were applied to a fluorescent lamp envelope and processed into a finished lamp according to known techniques, identical to those of Example I.

EXAMPLE IV

Particles of calcium halophosphate (Cool White No. 4459, Lot 795) were coated with a continuous aluminum oxide coating as described in Example I. The coated phosphor particles were applied to the lamp envelope in an aqueous suspension containing 1.75% by weight Aluminum Oxide C and processed into a finished lamp by known techniques. There was no milling of the phosphor during the fabrication procedure.

EXAMPLE V

A lamp was prepared in accordance with Example IV with inclusion of the additional step of gentle milling.

The phosphor luminance and maintenance data for the standard 4 Foot T-12 (40 Watt) cool white fluorescent lamps of Examples I-V appear in Table I.

TABLE I

| EXAMPLE | SUSPENSION | PHOSPHOR | PHOSPHOR LUMINANCE (MAINTENANCE) | | | | | | |
|---|---|---|---|---|---|---|---|---|---|
| | | | 0 HOURS | 100 HOURS | 500 HOURS | 1,000 HOURS | 2,000 HOURS | 3,000 HOURS | 5,000 HOURS |
| I | Organic | Al$_2$O$_3$—Coated Lot 795 | 3216 | 3115 (96.8) | 3082 (95.8) | 3035 (94.4) | 2965 (92.3) | 2935 (91.2) | 2858 (88.9) |
| II | Organic | Admixed 0.05% "ALON C" + Uncoated Lot 795 | 3253 | 3080 (94.7) | 2973 (91.4) | 2901 (89.2) | 2818 (86.6) | 2792 (85.8) | 2699 (82.9) |
| III | Organic | Uncoated Lot 795 | 3253 | 3118 (95.8) | 3031 (93.2) | 2964 (91.1) | 2884 (88.7) | 2854 (88.6) | 2791 (85.8) |
| IV | Water | Al$_2$O$_3$—Coated Lot 795 | 3189 | 3105 (97.4) | 3044 (95.4) | 2995 (93.9) | 2914 (91.4) | 2839 (89.0) | 2755 (86.4) |
| V | Water | Al$_2$O$_3$—Coated Lot 795 | 3224 | 3104 (96.3) | 3027 (93.9) | 2965 (92.0) | 2838 (88.0) | 2798 (86.8) | 2696 (83.6) |

As shown in Table I, while the uncoated phosphor has a higher lumen output at 0 hours, the maintenance of phosphors with continuous aluminum oxide coatings is improved over uncoated phosphors.

The effect of the phosphor coating on fluorescent lamp phosphor maintenance was further evaluated in the standard 4 Foot T12 VHO (Very High Output) lamp:

EXAMPLE VI

Uncoated particles of calcium halophosphate (Cool White No. 4459, Lot 501) were applied to the lamp envelope in an aqueous suspension and processed into a finished lamp by known techniques.

EXAMPLE VII

Particles of calcium halophosphate (Cool White No. 4459, Lot 501) were coated with a continuous aluminum oxide coating as described in Example I. The coated phosphor particles were applied to the lamp envelope in an aqueous suspension and processed into a finished lamp by known techniques. There was no milling of the phosphor during the fabrication procedure.

The phosphor luminance and maintenance data for the 4 Foot T-12 VHO cool white fluorescent lamps of Examples VI and VII appear in Table II.

TABLE II

| EX. | SOLVENT | PHOSPHOR | METHOD | PHOSPHOR LUMINANCE (MAINTENANCE) | | | | | | | | |
|---|---|---|---|---|---|---|---|---|---|---|---|---|
| | | | | 0 HOURS | 100 HOURS | 300 HOURS | 500 HOURS | 1,000 HOURS | 2,000 HOURS | 3,000 HOURS | 4,000 HOURS | 5,000 HOURS |
| VI | Water | Uncoated | "Milled" | 7704 | 6981 (90.6) | 6763 (87.8) | 6470 (84.0) | 6085 (79.0) | 5479 (71.1) | 4952 (64.3) | 4681 (60.8) | 4368 (56.7) |
| VII | Water | Al$_2$O$_3$— | Stirred | 7696 | 6997 | 6866 | 6621 | 6335 | 6014 | 5464 | 5351 | 5134 |

TABLE II-continued

| EX. | SOL-VENT | PHOS-PHOR | METHOD | PHOSPHOR LUMINANCE (MAINTENANCE) | | | | | | | | |
|---|---|---|---|---|---|---|---|---|---|---|---|---|
| | | | | 0 HOURS | 100 HOURS | 300 HOURS | 500 HOURS | 1,000 HOURS | 2,000 HOURS | 3,000 HOURS | 4,000 HOURS | 5,000 HOURS |
| | | Coated | In | | (90.9) | (89.2) | (86.0) | (82.3) | (78.1) | (71.0) | (69.5) | (66.7) |

As can be seen from Tables I and II, while the uncoated phosphor is initially brighter, the light output of the uncoated phosphor decreases more rapidly as a function of time than the coated phosphor. The lamps provided with the coated phosphor also exhibit a resistance to degradation of the phosphor during the lehring step of lamp fabrication. An additional advantage associated with using the continuously coated phosphor particle in a fluorescent lamp is that the lamp coating can be prepared by a stir-in method and does not require milling. Uncoated cool white cannot be "stirred-in" and requires milling.

The effect of the thickness of the aluminum oxide particle coating on fluorescent lamp maintenance was evaluated in the standard 4 foot-T12 VHO lamp:

EXAMPLE VIII

In this example, uncoated particles of cool white alkaline earth halophosphate phosphor powder (Cool White No. 4459, Lot 769) were applied to the inner surface of the lamp envelope according to known techniques, including the steps of slurrying the phosphor in an aqueous suspension containing 1.75% by weight Aluminum Oxide C and normal wet sieving.

EXAMPLE IX

In this example, particles of cool white alkaline earth halophosphate phosphor powder were individually coated with a continuous aluminum oxide coating, using the process described in Example I. Three hundred grams of calcium halophosphate phosphor powder (Cool White No. 4459, Lot 769) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via a carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to and maintained at a temperature of about 45° C.

The frit area of the reaction tube was maintained at a temperature of from about 60° C. to about 150° C.; the oxidizing gas inlet area, located above the vibrating disc, was heated to an maintained at a temperature of about 400° C.; and the area above the oxidizing gas inlet area was heated to and maintained at a temperature of about 550° C.

A nitrogen flow of about 100 cc/min was passed into the bubbler, and the nitrogen gas containing vaporized trimethyl aluminum was transported by nitrogen carrier gas into the reaction tube at a flow rate of about 550 cc/min. The stream of oxygen gas diluted with nitrogen gas was passed into the reaction tube through the second carrier line. The flow rate of the oxygen was 495 cc/min and that of the nitrogen diluent was about 50 cc/min. A concentration ratio of $O_2$ to trimethyl aluminum of about 200 to 1 was maintained during this reaction to obtain a white body color.

The process was continued for 6 hours and an aluminum oxide coating having a thickness of about 100 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

The coated phosphor particles were applied to the inner surface of the lamp envelope according to known techniques, including the steps of slurrying the coated phosphor in an aqueous suspension containing 1.75% by weight Aluminum Oxide C and normal wet sieving.

EXAMPLE X

In this example, particles of cool white alkaline earth halophosphate phosphor powder were individually coated with a continuous aluminum oxide coating, using the process described in Example I. Three hundred grams of calcium halophosphate phosphor powder (Cool White No. 4459, Lot 769) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 500 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 4 hours and an aluminum oxide coating having a thickness of about 100 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

The coated phosphor particles were applied to the inner surface of the lamp envelope according to known techniques, including the steps of slurrying the coated phosphor in an aqueous suspension containing 1.75% by weight Aluminum Oxide C and normal wet sieving.

EXAMPLE XI

In this example, particles of cool white alkaline earth halophosphate phosphor powder were individually coated with a continuous aluminum oxide coating, using the process described in Example I. Three hundred grams of calcium halophosphate phosphor powder (Cool White No. 4459, Lot 769) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 100 cc/min was passed into the bubbler, and the nitrogen gas containing vaporized trimethyl aluminum was transported by nitrogen carrier gas into the reaction tube at a flow rate of about 550 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 9 hours and an aluminum oxide coating having a thickness of about 150 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

The coated phosphor particles were applied to the inner surface of the lamp envelope according to known techniques, including the steps of slurrying the coated phosphor in an aqueous suspension containing 1.75% by weight Aluminum Oxide C and normal wet sieving.

EXAMPLE XII

In this example, particles of cool white alkaline earth halophosphate phosphor powder were individually coated with a continuous aluminum oxide coating, using the process described in Example I. Three hundred grams of calcium halophosphate phosphor powder (Cool White No. 4459, Lot 769) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 550 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 9 hours and an aluminum oxide coating having a thickness of about 150 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

The coated phosphor particles were applied to the inner surface of the lamp envelope according to known techniques, including the steps of slurrying the coated phosphor in an aqueous suspension containing 1.75% by weight Aluminum Oxide C and normal wet sieving.

EXAMPLE XIII

In this example, particles of cool white alkaline earth halophosphate phosphor powder were individually coated with a continuous aluminum oxide coating, using the process described in Example I. Three hundred grams of calcium halophosphate phosphor powder (Cool White No. 4459, Lot 769) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 500 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 8 hours and an aluminum oxide coating having a thickness of about 200 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

The coated phosphor particles were applied to the inner surface of the lamp envelope according to known techniques, including the steps of slurrying the coated phosphor in an aqueous suspension containing 1.75% by weight Aluminum Oxide C and normal wet sieving.

EXAMPLE XIV

In this example, particles of cool white alkaline earth halophosphate phosphor powder were individually coated with a continuous aluminum oxide coating, using the apparatus described in Example I. Three hundred grams of calcium halophosphate phosphor powder (Cool White No. 4459, Lot 769) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported by nitrogen carrier gas into the reaction tube at a flow rate of about 500 cc/min. The stream of oxygen gas diluted with nitrogen gas was passed into the reaction tube through the second carrier line. The flow rate of oxygen was about 495 cc/min and that of the nitrogen diluent was about 50 cc/min. A concentration ratio of $O_2$ to trimethyl aluminum of about 200 to 1 was maintained during this reaction to obtain a white body color.

The process was continued for 12 hours and an aluminum oxide coating having a thickness of about 300 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

The coated phosphor particles were applied to the inner surface of the lamp envelope according to known techniques including the steps of slurrying the coated phosphor in an aqueous suspension containing 1.75% by weight Aluminum Oxide C and normal wet sieving.

EXAMPLE XV

In this example, particles of cool white alkaline earth halophosphate phosphor powder were individually coated with a continuous aluminum oxide coating, using the process described in Example I. Three hundred grams of calcium halophosphate phosphor powder (Cool White No. 4459, Lot 769) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the alkaline earth halophosphate powder. The mixture of the halophosphate phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 200 cc/min was passed into the bubbler, and the nitrogen gas containing vaporized trimethyl aluminum was transported by nitrogen carrier gas into the reaction tube at a flow rate of about 450 cc/min. The stream of oxygen gas diluted with nitrogen gas was passed into the reaction tube through the second carrier line. The flow rate of oxygen was about 496 cc/min and that of the nitrogen diluent was about 50 cc/min. A concentration ratio of $O_2$ to trimethyl aluminum of about 200 to 1 was maintained during this reaction to obtain a white body color.

The process was continued for 12 hours and an aluminum oxide coating having a thickness of about 300 Angstroms was formed on the phosphor particles.

Electron microscopy of the coated phosphor particles of this example indicated a smooth conformal coating of aluminum oxide on the cool white alkaline earth halophosphate phosphor particles. The continuous and conformal nature of the coating applied to the phosphor particle in the example was demonstrated by the replication of the submicron features of the phosphor substrate. The submicron features of the coated particle, however, are visibly less pronounced when compared to the submicron features of an uncoated particle.

The coated phosphor particles were applied to the inner surface of the lamp envelope according to known techniques, including the steps of slurrying the coated phosphor in aqueous suspension containing 1.75% by weight Aluminum Oxide C and normal wet sieving.

SEM photomicrographs of uncoated cool white phosphor particles, uncoated cool white phosphor particles which had been mechanically mixed with 0.05 weight percent Aluminum Oxide C, and the coated cool white phosphor particles of Examples IX through XV were compared. The photomicrographs revealed that as the coating thickness is increased above 150 Angstroms, a preferential growth of the alumina coating is visible on those parts of the phosphor particle to which Aluminum Oxide C particles had adhered during the powder preparation. This effect becomes increasingly more visible as the coating thickness increases. Also the replication of submicron features becomes less clearly pronounced with increasing coating thickness under very high resolution (50,000-100,000 X) SEM analysis.

The phosphor luminance and maintenance data for the standard 4 Foot T-12 VHO cool white fluorescent lamps of Examples VIII-XV appear in Table III. While the data show some variation in maintenance improvement within the thickness series, all coating thicknesses studied result in improved fluorescent lamp maintenance.

TABLE III

| EX. | SOLVENT | METHOD | Al₂O₃ COATING THICKNESS (ANGSTROMS) | FLOW RATE INTO BUBBLER (CC/MIN) | PHOSPHOR LUMINANCE (MAINTENANCE) | | | | |
|---|---|---|---|---|---|---|---|---|---|
| | | | | | 0 HOURS | 100 HOURS | 500 HOURS | 1,000 HOURS | 2,000 HOURS |
| VIII | Water | Wet Sieve | 0 | — | 7805 — | 6894 (88.3) | 6266 (80.3) | 5860 (75.1) | 5254 (67.3) |
| IX | Water | Wet Sieve | 100 | 100 | 7787 — | 6858 (88.1) | 6376 (81.9) | 6118 (78.6) | 5669 (72.8) |
| X | Water | Wet Sieve | 100 | 150 | 7672 — | 6765 (88.2) | 6239 (81.3) | 5980 (77.9) | 5388 (70.2) |
| XI | Water | Wet Sieve | 150 | 100 | 7745 — | 6969 (90.0) | 6508 (84.0) | 6282 (81.1) | 5786 (74.7) |
| XII | Water | Wet Sieve | 150 | 150 | 7707 — | 6811 (88.4) | 6308 (81.8) | 6068 (78.7) | 5616 (72.9) |
| XIII | Water | Wet Sieve | 200 | 150 | 7620 — | 6725 (88.2) | 6248 (81.9) | 5914 (77.6) | 5385 (70.6) |
| XIV | Water | Wet Sieve | 300 | 150 | 7552 — | 6765 (89.6) | 6244 (82.7) | 5998 (79.4) | 5531 (73.2) |
| XV | Water | Wet Sieve | 400 | 200 | 7416 — | 6632 (89.4) | 6123 (82.6) | 5872 (79.2) | 5407 (72.9) |

The effect of the manner in which the phosphor coating is prepared prior to being applied to the inner surface of the lamp envelope was evaluated in the standard 4 Foot - T12 VHO lamp:

EXAMPLE XVI

Uncoated particles of calcium halophosphate (Cool White No. 4459, Lot 501) were applied to the lamp envelope in an aqueous suspension containing 1.75% by weight Aluminum Oxide C and processed into a finished lamp by known techniques. The phosphor was gently milled during the fabrication procedure.

EXAMPLE XVII

Particles of calcium halophosphate (Cool White No. 4459, Lot 501) were coated with a continuous aluminum oxide coating having a thickness of 150 Angstroms, as described in Example I. The coated phosphor particles were applied to the lamp envelope in an aqueous suspension containing 1.75% by weight Aluminum Oxide C and processed into a finished lamp by known techniques. There was no milling of the phosphor during the fabrication procedure.

EXAMPLE XVIII

A lamp was prepared in accordance with Example XVII with the inclusion of the additional step of gentle milling.

EXAMPLE XIX

Particles of calcium halophosphate (Cool White No. 4459, Lot 501) were coated with a continuous aluminum oxide coating having a thickness of 150 Angstroms, as described in Example I. The coated phosphor particles were applied to the inner surface of the lamp envelope according to known techniques, including the steps of slurrying the coated phosphor in an aqueous suspension containing 1.75% by weight Aluminum Oxide C and normal wet sieving.

EXAMPLE XX

Particles of calcium halophosphate (Cool White No. 4459, Lot 501) were coated with a continuous aluminum oxide coating having a thickness of 150 Angstroms, as described in Example I. The coated phosphor particles were applied to the inner surface of the lamp envelope according to known techniques, including the steps of slurrying the coated phosphor in an organic solvent containing 1% by weight Aluminum Oxide C and normal wet sieving.

The phosphor luminance and maintenance data for the standard 4 Foot T-12 VHO cool white fluorescent lamps of Examples XVI–XX appear in Table IV. Although maintenance improvements are seen for all the fabrication methods tested, the greater maintenance improvement for lamps using individually and continuously coated phosphor particles is seen in lamp fabricated using wet-sieving. The data in Table IV and Table I support the theory that milling may be detrimental to optimum lamp performance for lamps using individually and continuously Al₂O₃-coated phosphor particles.

TABLE IV

| EX. | PHOSPHOR | METHOD | PHOSPHOR LUMINANCE (MAINTENANCE) | | | | | | | |
|---|---|---|---|---|---|---|---|---|---|---|
| | | | 0 HOURS | 171 HOURS | 500 HOURS | 1,000 HOURS | 1,470 HOURS | 2,000 HOURS | 3,000 HOURS | 4,000 HOURS |
| XVI | Uncoated Lot 501 | Aqueous Suspension Milled | 7603 — | 6900 (90.8) | 6699 (88.1) | 6177 (81.2) | 5443 (71.6) | 5440 (71.6) | 5039 (66.3) | 4760 (62.6) |
| XVII | Al₂O₃—Coated Lot 501 | Aqueous Suspension Stirred-in | 7410 — | 6886 (92.9) | 6588 (88.9) | 6228 (84.0) | 5860 (79.1) | 5885 (79.4) | 5620 (75.8) | 5490 (74.1) |
| XVIII | Al₂O₃—Coated Lot 501 | Aqueous Suspension Milled | 7451 — | 6735 (90.4) | 6436 (86.4) | 6126 (82.2) | 5727 (76.9) | 5673 (76.1) | 5437 (73.0) | 5252 (70.5) |
| XIX | Al₂O₃—Coated Lot 501 | Aqueous Suspension Wet Sieved | 7347 — | 6992 (95.2) | 6753 (91.9) | 6408 (87.2) | 6235 (84.9) | 6060 (82.5) | 5833 (79.4) | 5737 (78.1) |
| XX | Al₂O₃—Coated | Organic | 7645 | 6976 | 6515 | 6257 | 5974 | 5892 | 5677 | 5417 |

TABLE IV-continued

| | | | PHOSPHOR LUMINANCE (MAINTENANCE) | | | | | | |
|---|---|---|---|---|---|---|---|---|---|
| EX. | PHOSPHOR | METHOD | 0 HOURS | 171 HOURS | 500 HOURS | 1,000 HOURS | 1,470 HOURS | 2,000 HOURS | 3,000 HOURS | 4,000 HOURS |
| | Lot 501 | Suspension Wet Sieved | — | (91.2) | (85.2) | (81.8) | (78.1) | (77.1) | (74.3) | (70.9) |

The effect of aluminum oxide coated phosphor particles on fluorescent lamp phosphor maintenance was further evaluated in the standard 6 Foot T12 HO (High Output) lamp:

EXAMPLE XXI

Uncoated particles of calcium halophosphate (Cool White No. 4459, Lot 501) were applied to a lamp envelope in an aqueous suspension and processed into a finished lamp by known techniques.

EXAMPLE XXII

Particles of calcium halophosphate (Cool White No. 4459, Lot 501) were coated with a continuous aluminum oxide coating, as described in Example I. The coated phosphor particles were applied to a lamp envelope in an aqueous suspension and processed into a finished lamp by known techniques. There was no milling of the phosphor during the fabrication procedure.

The phosphor luminance and maintenance data of the 6 Foot - T12 HO cool white fluorescent lamps of Examples XXI and XXII appear in Table V.

TABLE V

| | | | | PHOSPHOR LUMINANCE (MAINTENANCE) | | | | | |
|---|---|---|---|---|---|---|---|---|---|
| EXAMPLE | SUSPENSION | PHOSPHOR | METHOD | 0 HOURS | 100 HOURS | 500 HOURS | 1,000 HOURS | 2,000 HOURS | 3,000 HOURS |
| XXI | Water | Uncoated Lot 501 | "Milled" | 7174 — | 6829 (95.6) | 6592 (91.9) | 6410 (89.4) | 5820 (81.1) | 5676 (79.1) |
| XXII | Water | Al$_2$O$_3$—Coated Lot 501 | Stirred-in | 6913 — | 6769 (97.9) | 6633 (95.9) | 6520 (94.3) | 6146 (88.9) | 6209 (89.8) |

EXAMPLE XXIII

In this example, particles of the green-emitting manganese doped zinc orthosilicate phosphor were individually coated with a continuous aluminum oxide coating, using the process described in Example I. The manganese doped zinc orthosilicate, or willemite, phosphor powder was sieved through a 400 mesh screen before being used in the present method to remove large agglomerates of particles. Three hundred grams of the sieved manganese doped zinc orthosilicate phosphor powder (Sylvania Type 2285) and 0.15 g (0.05 weight percent) Aluminum Oxide C, available from Degussa, Inc., the fluidizing aid, were dry blended in a polyethylene jar to obtain a uniform dispersion of the Aluminum Oxide C fluidizing aid throughout the phosphor powder. The mixture of the phosphor powder and fluidizing aid was added to the quartz glass reaction tube to form the phosphor bed. Liquid trimethyl aluminum was used in the stainless steel bubbler as the coating precursor material. The carrier gas was bubbled into the trimethyl aluminum liquid to form carrier gas containing vaporized trimethyl aluminum. The carrier gas containing vaporized trimethyl aluminum was transported via the carrier line to the quartz glass reaction tube. Oxygen gas diluted with nitrogen was transported into the fluidized bed through the holes located on the shaft of the vibrating mixer. The vibrating mixer was operated at a speed at 60 cycles/minute.

The bubbler and the nitrogen gas line leading into the bubbler were both heated to and maintained at a temperature of 30° C. The line leading out of the bubbler and into the bottom of the quartz glass reaction tube was heated to an maintained at a temperature of about 45° C.

The frit area of the reaction tube was maintained at a temperature of from about 60° C. to about 150° C.; the oxidizing gas inlet area, located above the vibrating disc, was heated to and maintained at a temperature of about 400° C.; and the area above the oxidizing gas inlet area was heated to and maintained at a temperature of about 550° C.

A nitrogen flow of about 150 cc/min was passed into the bubbler, and the nitrogen gas containing vaporized trimethyl aluminum was transported into the reaction tube by nitrogen carrier gas at a flow rate of about 500 cc/min. The stream of oxygen gas diluted with nitrogen gas was passed into the reaction tube through the second carrier line. The flow rate of the oxygen was about 500 cc/min and that of the nitrogen diluent was about 50 cc/min. A concentration ratio of $O_2$ to trimethyl aluminum of about 200 to 1 was maintained during this reaction to obtain a white body color.

The process was continued for 12 hours and an aluminum oxide coating having a thickness of about 250 Angstroms was formed on the phosphor particles.

The aluminum oxide coated particles of the willemite were removed from the reaction tube.

Electron microscopy of the coated phosphor particles of this example indicated a smooth conformal coating of aluminum oxide on the willemite phosphor particles. The continuous and conformal nature of the coating applied to the phosphor particle in the example is demonstrated by the replication of the submicron features of the phosphor substrate. The submicron features of the coated particle, however, are visibly less pronounced when compared to the submicron features of an uncoated particle.

Auger analysis of the coated particle surface revealed that complete surface coverage by aluminum oxide had been achieved, based upon the complete attenuation of the zinc, manganese, and silicon in the coated willemite compared to the uncoated willemite phosphor standard.

The individually and continuously coated phosphor particles were then applied to the inner surface of a fluorescent lamp envelope, and processed into a finished 4 Foot - T12 (40 Watt) fluorescent lamp according to known techniques, including the steps of slurrying the phosphor in an organic solvent containing 0.6% by weight Aluminum Oxide C, and normal wet sieving. There was no milling of the phosphor during the fabrication procedure. No $Sb_2O_3$ was added to the slurry.

EXAMPLE XXIV

Uncoated particles of manganese-doped zinc orthosilicate (Sylvania Type 2285) were applied to the inner surface of a fluorescent lamp envelope and processed into a finished 4 Foot - T12 (40 Watt) fluorescent lamp according to known techniques, including the steps of slurrying the phosphor in an organic solvent containing 0.6% by weight Aluminum Oxide C, and normal wet sieving. There was no milling of the phosphor during the fabrication. No $Sb_2O_3$ was added to the slurry.

EXAMPLE XXV

Uncoated particles of manganese-doped zinc orthosilicate (Sylvania Type 2285) were applied to the inner surface of a fluorescent lamp envelope and processed into a finished 4 Foot - T12 (40 Watt) fluorescent lamp according to known techniques, including the steps of slurrying the phosphor in an organic solvent containing 0.6% by weight Aluminum Oxide C and gentle milling of the phosphor during the fabrication. Antimony (III) oxide ($Sb_2O_3$) was added to the coating suspension. An addition of $Sb_2O_3$ to the coating suspension used in lamp manufacture is known to improve maintenance. Keith H. Butler, *FLUORESCENT LAMP PHOSPHORS—TECHNOLOGY AND THEORY*, The Pennsylvania State University Press (University Park, Pa. 1980) page 8. The addition of $Sb_2O_3$ is standard in the industry unless otherwise specified.

The phosphor luminance and maintenance data for the 4 Foot - T12 (40 Watt) manganese-doped zinc orthosilicate fluorescent lamps of Examples XXIII through XXV appear in Table VI. An exceptional improvement in lumen maintenance is seen for lamps using individually and continuously $Al_2O_3$-coated particles of manganese-doped zinc orthosilicate phosphor The coating thickness reported in each of the preceding examples was calculated using the following equation:

$$t_{coating/hour} = \frac{\text{grams } Al_2O_3/\text{hour}}{3.97 \text{ g } Al_2O_3/cc \times \text{Surface area of phosphor} \times \text{total bed loading}}$$

TABLE VI

| EXAMPLE | COATING SUSPENSION | PHOSPHOR | PHOSPHOR LUMINANCE (MAINTENANCE) | | | |
|---|---|---|---|---|---|---|
| | | | 0 HOURS | 100 HOURS | 500 HOURS | 1,000 HOURS |
| XXIII | Organic Wet Sieve No $Sb_2O_3$ | $Al_2O_3$—Coated $ZnSiO_4$:Mn | 4696 — | 4618 (98.3) | 4558 (97.0) | 4496 (95.7) |
| XXIV | Organic Wet Sieved No $Sb_2O_3$ | Uncoated $ZnSiO_4$:Mn | 4745 — | 4296 (90.5) | 3634 (76.6) | 3181 (67.0) |
| XXV | Organic Wet Sieved $Sb_3O_3$ Added | Uncoated $ZnSiO_4$:Mn | 4393 — | 4093 (93.2) | 3821 (87.0) | 3465 (78.9) |

While there have been shown what are at present considered to be the preferred embodiments of the invention, it will be apparent to those skilled in the art that various changes and modifications can be made herein without departing from the scope of the invention as defined by the appended claims.

What is claimed is:

1. A method for improving lumen maintenance of fluroescent lamps comprising the steps of
   (a) depositing a continuous aluminum oxide coating on individual particles of a finely-divided fluroescent lamp phosphor to form individually coated phosphor particles, each phosphor particle being surrounded by a nonparticulate aluminum oxide coating of a conformal nature:
   (b) applying one or more layers of phosphor to a fluroescent lamp envelope to form a phosphor coated envelope, at least one of the phosphor layers having a phosphor component comprising said individually coated phosphor particles;
   (c) processing said phosphor coated envelope into a finished lamp.

2. A method in accordance with claim 1 wherein said finely-divided fluorescent lamp phosphor is alkaline earth halophosphate.

3. A method in accordance with claim 1 wherein said finely-divided fluroescent lamp phosphor is managanese-doped zinc orthosilicate.

4. A method in accordance with claim 1 wherein the continuous aluminum oxide coating is deposited on the individual particles of a finely-divided fluorescent lamp phosphor by chemical vapor deposition while the particles are suspended in a fluidized bed.

5. A method in accordance with claim 1 wherein the continuous aluminum oxide coating is deposited on the individual particles of a finely-divided fluorescent lamp phosphor powder by chemical vapor deposition while the particles are suspended in a fluidized bed, the fluidized particles being exposed to a vaporized aluminum-containing precursor material at a first temperature, the first temperature being less than the temperature at which the precursor material decomposes, and the precursor material being reacted to form a continuous aluminum oxide coating on the surface of the individual particles at a second temperature, the second temperature being greater than or equal to the temperature at which the precursor material reacts to form aluminum oxide.

6. A method for improving lumen maintenance of fluroescent lamps comprising the steps of
   (a) coating individual particles of a finely-divided fluroescent lamp phosphor powder by fluidizing the powder and applying a continuous aluminum oxide coating to the individual particles by chemical vapor deposition while the particles are suspended in a fluidized bed to form individually coated phosphor particles, each particle being surrounded by a nonparticulate aluminum oxide coating of a conformal nature:
(b) applying one or more layers of phosphor to a fluorescent lamp envelope to form a phosphor coated envelope, at least one of the phosphor layers having a phosphor component comprising said individually coated phosphor particles; and
(c) processing said phosphor coated envelope into a finished lamp.

7. A method for improving lumen maintenance of fluorescent lamps comprising the steps of
(a) coating individual particles of a finely-divided cool-white alkaline earth halophosphate phosphor powder by fluidizing the powder and applying a continuous aluminum oxide coating to the individual particles by chemical vapor deposition while the particles are suspended in a fluidized bed to form individually coated phosphor particles, each particle being surround by a conformal, nonparticulate aluminum oxide coating:
(b) applying one or more layers of phosphor to a fluroescent lamp envelope to form a phosphor coated envelope, at least one of the phosphor layers having a phosphor component comprising said individually coated phosphor particles; and
(c) processing said phosphor coated envelope into a finished lamp.

8. A method for improving lumen maintenance of fluorescent lamps comprising the steps of
(a) coating individual particles of a finely-divided manganese-doped zinc orthosilicate phosphor powder by fluidizing the powder and applying a continuous aluminum oxide coating to the individual particles by chemical vapor deposition while the particles are suspended in a fluidized bed to form individually coated phosphor particles, each particle being surrounded by a conformal, nonparticulate aluminum oxide coating;
(b) applying one or more layers of phosphor to a fluorescent lamp envelope to form a phosphor coated envelope, at least one of the phosphor layers having a phosphor component comprising said individually coated phospher particles; and
(c) processing said phosphor coated envelope into a finished lamp.

9. A fluorescent lamp comprising a glass envelope having an inner wall wherein the inner wall of the glass envelope is coated with one or more layers of phosphor, at least one of the phosphor layers having a phosphor component comprising individual particles of a finely-divided fluorescent lamp phosphor which have been individually coated with a nonparticulate aluminum oxide coating of a conformed nature.

10. A fluorescent lamp in accordance with claim 9 wherein the finely-divided fluorescent lamp phosphor is alkaline earth halophosphate phosphor.

11. A fluorescent lamp in accordance with claim 9 wherein the finely-divided fluorescent lamp phosphor is manganese-doped zinc orthosilicate phosphor.

12. A fluorescent lamp comprising a glass envelope having an inner wall wherein the inner wall of the glass envelope is coated with one or more layers of phosphor, at least one of the phosphor layers having a phosphor component comprising particles of a finely-divided fluorescent lamp phosphor which have been individually coated with a nonparticulate aluminum oxide coating of a conformed nature by chemical vapor deposition in a fluidized bed.

13. A fluorescent lamp comprising a glass envelope having an inner wall wherein the inner wall of the glass envelope is coated with one or more layers of phosphor, at least one of the phosphor layers having a phosphor component comprising particles of alkaline earth halophosphate phosphor which have been individually coated with a nonparticulate aluminum oxide coating of a conformal nature by chemical vapor deposition in a fluidized bed.

14. A fluorescent lamp comprising a glass envelope having an inner wall wherein the inner wall of the glass envelope is coated with one or more layers of phosphor, at least one of the phosphor layers having a phosphor component comprising particles of a manganese-doped zinc orthosilicate phosphor powder which have been individually coated with a nonparticulate aluminum oxide coating of a conformal nature by chemical vapor deposition in a fluidized bed.

15. A fluorescent lamp comprising a glass envelope having an inner wall wherein the inner wall of the glass envelope is coated with a phosphor comprising particles of a finely-divided fluorescent lamp phosphor powder which have been individually coated with a nonparticulate aluminum oxide coating of a conformal nature.

16. A fluorescent lamp in accordance with claim 15 wherein the finely-divided fluorescent lamp phosphor is alkaline earth halophosphate phosphor.

17. A fluorescent lamp in accordance with claim 15 wherein the finely-divided fluorescent lamp phosphor is manganese-doped zinc orthosilicate phosphor.

18. A fluorescent lamp comprising a glass envelope having an inner wall wherein the inner wall of the glass envelope is coated with a phosphor comprising particles of alkaline earth halophosphate phosphor which have been individually coated with a nonparticulate aluminum oxide coating of a conformal nature by chemical vapor deposition in a fluidized bed.

19. A fluroescent lamp comprising a glass envelope having an inner wall wherein the inner wall of the glass envelope is coated with a phosphor comprising particles of a manganese-doped zinc orthosilicate phosphor which have been individually coated with a nonparticulate aluminum oxide coating of a conformal nature by chemical vapor deposition in a fluidized bed.

* * * * *

UNITED STATES PATENT AND TRADEMARK OFFICE
CERTIFICATE OF CORRECTION

PATENT NO. : 4,710,674
DATED : December 1, 1987
INVENTOR(S) : A. Gary Sigai

It is certified that error appears in the above—identified patent and that said Letters Patent is hereby corrected as shown below:

Column 25, line 54: Please change "conformed" to --conformal--.

Column 26, line 11: Please change "conformed" to --conformal--.

Signed and Sealed this

Seventeenth Day of May, 1988

Attest:

*Attesting Officer*

DONALD J. QUIGG

*Commissioner of Patents and Trademarks*